(12) United States Patent
Detournay et al.

(10) Patent No.: US 8,206,670 B2
(45) Date of Patent: Jun. 26, 2012

(54) PROCESS FOR PRODUCING SODIUM BICARBONATE FOR FLUE GAS DESULPHURIZATION

(75) Inventors: Jean-Paul Detournay, Brussels (BE); Francis Coustry, Alsemberg (BE)

(73) Assignee: Solvay SA, Brussels (BE)

( * ) Notice: Subject to any disclaimer, the term of this patent is extended or adjusted under 35 U.S.C. 154(b) by 15 days.

(21) Appl. No.: 12/811,639

(22) PCT Filed: Jan. 6, 2009

(86) PCT No.: PCT/EP2009/050073
§ 371 (c)(1),
(2), (4) Date: Jul. 2, 2010

(87) PCT Pub. No.: WO2009/087143
PCT Pub. Date: Jul. 16, 2009

(65) Prior Publication Data
US 2010/0290967 A1 Nov. 18, 2010

(30) Foreign Application Priority Data
Jan. 7, 2008 (FR) ...................... 08 50058

(51) Int. Cl.
*C01D 7/00* (2006.01)
*C01D 7/07* (2006.01)

(52) U.S. Cl. .............. 423/244.07; 423/244.08; 423/422; 423/555

(58) Field of Classification Search ............. 423/244.07, 423/244.08, 422, 555
See application file for complete search history.

(56) References Cited

U.S. PATENT DOCUMENTS

| | | | |
|---|---|---|---|
| 3,645,882 A | 2/1972 | Parsi | |
| 4,385,039 A | 5/1983 | Lowell et al. | |
| 4,629,545 A | 12/1986 | Mani | |
| 5,474,581 A | 12/1995 | Ninane et al. | |
| 6,171,567 B1 | 1/2001 | Fagiolini | |
| 6,924,318 B2 | 8/2005 | Mischi et al. | |
| 2009/0288957 A1 | 11/2009 | Detournay et al. | |
| 2010/0290967 A1* | 11/2010 | Detournay et al. | 423/242.1 |

FOREIGN PATENT DOCUMENTS

| | | |
|---|---|---|
| CA | 2240342 A1 | 12/1998 |
| EP | 740577 B1 | 7/1995 |
| EP | 884093 A1 | 12/1998 |
| FR | 2679221 A1 | 1/1993 |
| WO | WO 01/79335 A1 | 10/2001 |
| WO | WO 2008/003787 A1 | 1/2008 |
| WO | WO 2009/087145 A1 | 7/2009 |
| WO | WO 2009/087149 A1 | 7/2009 |

OTHER PUBLICATIONS

U.S. Appl. No. 12/811,663, filed Jul. 2, 2010, Jean-Paul Detournay et al.
U.S. Appl. No. 12/811,643, filed Jul. 2, 2010, Jean-Paul Detournay et al.
U.S. Appl. No. 12/305,444, filed Dec. 18, 2008, Jean-Paul Detournay et al.
Kuppinger, F-F et al.—"Elektromembranverfahren Teil 2 : Anwendungsbeispiele"—Chem. Ing. Tech. vol. 67, 1995, (6), pp. 731-739; 9 pgs XP002051515 (in German; Abstract in English).

* cited by examiner

*Primary Examiner* — Timothy Vanoy
(74) *Attorney, Agent, or Firm* — Beatrice C. Ortego

(57) ABSTRACT

Process for producing sodium bicarbonate for purifying flue gases, according to which an aqueous solution containing sodium sulfate is subjected to electrodialysis to produce a sodium hydroxide solution and a sodium bisulfate solution, the sodium hydroxide solution being carbonated in order to obtain sodium bicarbonate.

17 Claims, 1 Drawing Sheet

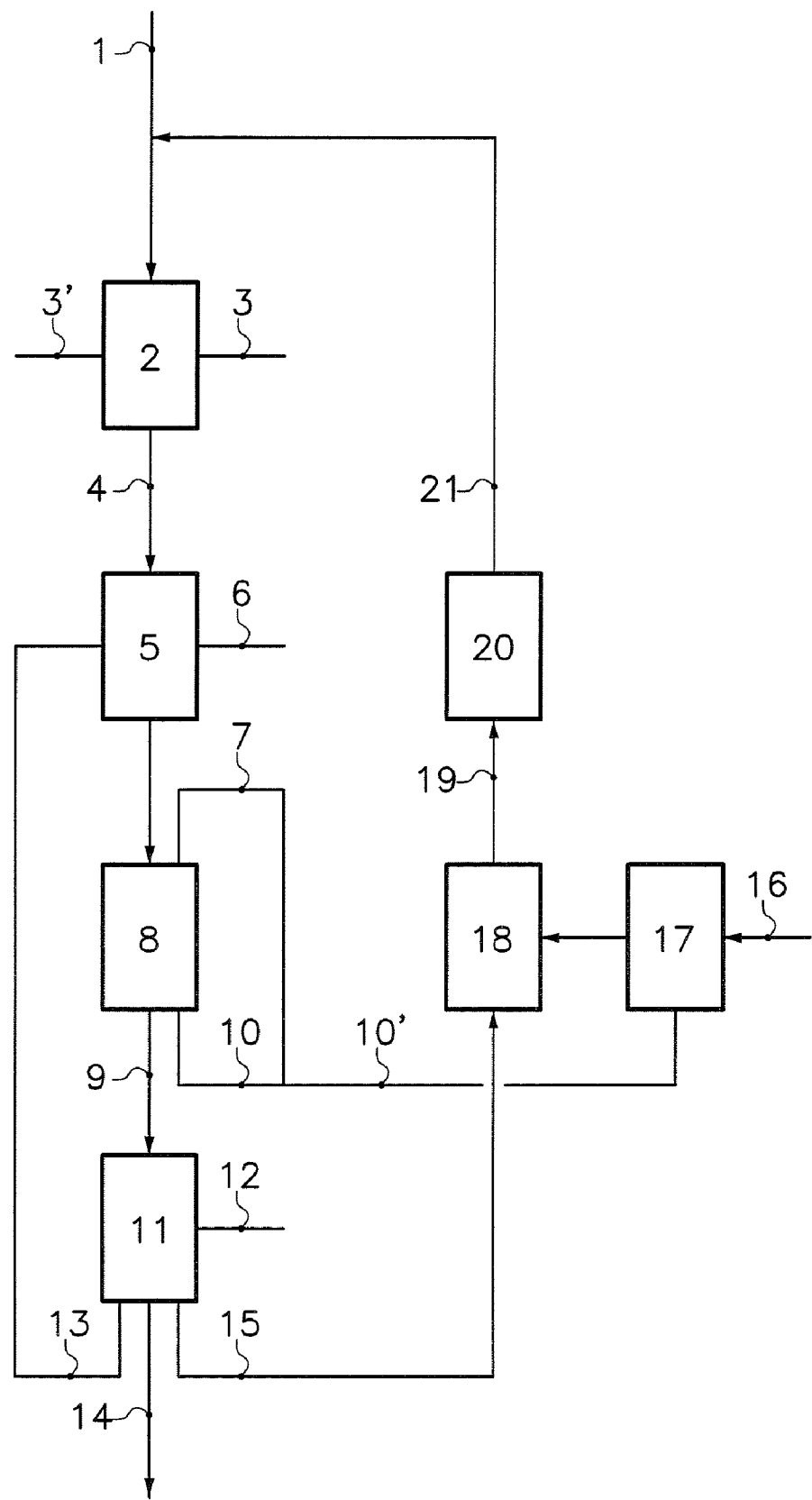

PROCESS FOR PRODUCING SODIUM BICARBONATE FOR FLUE GAS DESULPHURIZATION

CROSS-REFERENCE TO RELATED APPLICATIONS

The present application is a U.S. national stage application under 35 U.S.C. §371 of International Application No. PCT/EP2009/050073 filed Jan. 6, 2009, which claims the priority benefit of French Application No. 08.50058 filed Jan. 7, 2008, the whole content of such application being incorporated herein by reference for all purposes.

FIELD OF THE INVENTION

The invention relates to the production of sodium bicarbonate. More particularly, it relates to the production of sodium bicarbonate for treating flue gases that contain sulfur oxides.

BACKGROUND OF THE INVENTION

Human activities produce large amounts of sulfur-containing residues, which are harmful to the ecology. Thus, the combustion of fossil fuels (coal, oil derivatives), in particular in thermal power plants for electricity production, leads to the formation of a large volume of sulfur oxides, the release of which into the atmosphere is not generally permissible.

One known and recommended technique for purifying flue gases of sulfur oxides consists is treating these gases with sodium bicarbonate. The sulfur oxides from the gas treated are of the type converted to sodium sulfate, easily separable from the gas.

There are various processes for obtaining sodium bicarbonate intended for purifying flue gases.

A first process, generally known as the ammonia process and commonly used in industry, consists in treating an ammoniacal brine with a gas containing carbon dioxide. The sodium bicarbonate obtained containing ammonia residues is calcined and the sodium carbonate obtained is dissolved in water. The resulting solution is recarbonated to produce an aqueous suspension of sodium bicarbonate crystals. The suspension is finally filtered to separate the crystals, which are dried to produce the desired sodium bicarbonate.

Other processes are based on the carbonation of sodium carbonate solutions obtained starting from natural sodium sesquicarbonate (trona).

These known processes have proved to consume large amounts of energy. The sodium bicarbonate that is derived therefrom is relatively expensive. Furthermore, these known processes, in order to be competitive, must be carried out in very large sized plants. The investments necessary for the creation of new plants that meet the present environmental standards are extremely high.

Moreover, these environmental standards require the elimination of sulfur oxides from ever-increasing quantities of industrial flue gases. There is therefore a significant need for sodium bicarbonate for treating flue gases which is inexpensive and of sufficient quality.

The invention aims to solve this problem.

SUMMARY OF THE INVENTION

Consequently, the invention relates to a process for producing sodium bicarbonate for treating flue gases, according to which an aqueous solution containing primary sodium sulfate is subjected to electrodialysis to produce a sodium hydroxide solution and a sodium bisulfate solution, the sodium hydroxide solution being carbonated in order to obtain sodium bicarbonate.

BRIEF DESCRIPTION OF THE DRAWINGS

FIG. 1 illustrates one particular embodiment of a process according to the invention.

DETAILED DESCRIPTION

Electrodialysis is a technique that consists in combining, within a set of adjoining compartments, bipolar ion-exchange membranes with anionic and/or cationic ion-exchange membranes. The anionic membranes are ion-exchange membranes that are permeable to anions and, ideally, impermeable to cations. The cationic membranes are themselves permeable to cations and impermeable to anions. A bipolar membrane is an ion-exchange membrane comprising a cationic face and an anionic face. Such membranes may be produced by joining a cationic membrane to an anionic membrane. The bipolar membrane is advantageously produced by the process described in Application WO01/79335 in the name of SOLVAY, in particular in the process that is claimed therein. Within the bipolar membrane, under the action of a sufficient local electric field, the dissociation of the water that has penetrated therein to its $H^+$ and $OH^-$ ions takes place, which ions then migrate on both sides of this membrane. There is therefore acidification in one of the compartments adjacent to the bipolar membrane and alkalinization in the other adjacent compartment. Successive bipolar membranes are separated by cationic or anionic monopolar membranes. When the electrodialyzers only possess bipolar membranes and one type of monopolar membranes (cationic or anionic), they are said to have two (types of) compartments. When they comprise the three types of membrane, they are said to have three compartments.

In one advantageous variant of the process according to the invention, the electrodialyzer is a two-compartment electrodialyzer. In this variant, the electrodialyzer only comprises bipolar and cationic membranes in alternation. The compartments located between the anionic face of the bipolar membrane and the cationic membrane, known as basic compartments, are typically fed with water. In these compartments there is a supply of $OH^-$ ions originating from the bipolar membrane and of $Na^+$ ions passing through the cationic membrane, therefore formation of NaOH. These compartments may also be fed with a dilute NaOH solution, which is further concentrated at the outlet of the compartment. It is recommended that the outlet concentration of the NaOH solution is equal to at least 15% by weight, preferably 20%, more preferably 25%. The compartments located between the cationic face of the bipolar membrane and the cationic membrane, known as acid compartments, are fed with a solution of $Na_2SO_4$. In these compartments there is supply of $H^+$ and extraction of $Na^+$, therefore conversion of sodium sulfate to sodium bisulfate ($NaHSO_4$).

In the process according to the invention, the sodium hydroxide solution is carbonated to obtain sodium bicarbonate. It is advantageous to use, for this purpose, a gas comprising carbon dioxide. Various carbon dioxide contents of the gas are possible. At the end of the carbonation of the aqueous sodium hydroxide solution, sodium bicarbonate is crystallized, with appearance of an aqueous suspension of sodium bicarbonate crystals. These crystals must finally be separated from the suspension, for example by centrifuging, then dried.

In a first recommended variant of the process according to the invention, the sodium hydroxide solution is carbonated by means of a gas comprising carbon dioxide obtained by reaction of sodium bisulfate with calcium carbonate, with co-production of secondary sodium sulfate and gypsum.

In a second recommended variant of the process according to the invention, the sodium hydroxide solution is carbonated in two steps, firstly by means of a gas poor in $CO_2$, containing less than 50%, preferably less than 30%, particularly preferably less than 20% by weight of $CO_2$. Following this first carbonation, a sodium carbonate solution is obtained, the sodium carbonate concentration of which is advantageously greater than 20% by weight, preferably greater than 25%, depending on the concentration of the sodium hydroxide solution. Solutions having a concentration between 27 and 32% are particularly preferred. Then, in a second step, the sodium carbonate solution obtained following this first carbonation is (bi)carbonated by means of a gas rich in $CO_2$, containing more than 50%, advantageously more than 70%, particularly preferably more than 90% of $CO_2$. In this second step, use is advantageously made of the carbon dioxide obtained by reaction of sodium bisulfate with calcium carbonate.

It is especially recommended, in this second recommended variant of the process according to the invention, to use different gas-liquid contactors for the two steps for carbonation of the sodium hydroxide solution. For the first step, use is advantageously made of a container filled with small hollowed out packing materials, stacked randomly in the container. The container is passed through preferably by an upward stream of gas poor in $CO_2$. The sodium hydroxide solution is advantageously sprayed at the top of the container and flows down over the packing materials. This results in an increase in the gas-liquid contact area, which is favourable for the reaction with the gas poor in $CO_2$. Moreover, despite the exothermic nature of the reaction, it is not generally necessary to cool the container, owing to the low $CO_2$ concentration of the gas used. For the second step, use is advantageously made of a container filled with the solution to be carbonated, passed through by an upward stream of gas rich in $CO_2$. In this second step, the container is generally equipped with cooling means to compensate for the exothermicity of the reaction. A suspension of sodium bicarbonate crystals is formed in the container. The suspension is drawn off, filtered to separate the sodium bicarbonate crystals, which are then dried. The residence time of the solution to be carbonated is adjusted to obtain the desired crystal size. The gas rich in $CO_2$ that reaches the top of the container is preferably recovered and reinjected at its base.

When the sodium bisulfate reacts with the calcium carbonate, sodium sulfate is co-produced. This sodium sulfate is known in this document as secondary sodium sulfate to distinguish it from the primary source of sodium sulfate that is used in the process according to the invention. It is advantageous for this co-produced secondary sodium sulfate to be recycled and subjected to electrodialysis. In this case it is added to the primary sodium sulfate that feeds the electrodialyzer.

The primary sodium sulfate may have various origins. Indeed, sodium sulfate is a co-product of many industries that consider it to be a waste product. The process according to the invention therefore makes it possible to convert a waste product to a high added value product, which can be used in flue gas treatment. This results in a reduction in the cost of producing sodium bicarbonate, which opens it up to a wider use in flue gas treatment.

In one particularly advantageous embodiment of the process according to the invention, the primary sodium sulfate is a residue of the flue gas purification in sulfur oxides by means of sodium bicarbonate. In this embodiment, it is especially recommended that the sodium bicarbonate is derived from the process according to the invention. In this way, the flue gas treatment reactant is regenerated. Furthermore, since the electrodialysis installations are of small size and require a modest investment, it is possible in this embodiment that the regeneration be carried out in situ, on the site of the flue gas purification, which reduces the transportation charges.

The invention therefore also relates to a process for purifying flue gases that contain sulfur oxides, according to which a reactant containing at least 10%, preferably at least 50%, of sodium bicarbonate, obtained by a process according to the invention, is injected into a duct in which the flue gas flows.

In the process for purifying flue gases according to the invention, it is recommended that the reactant be in the form of a powder having an average particle diameter D50 between 5 and 50 μm. For this purpose, the sodium bicarbonate obtained by the process according to the invention will, if necessary, be ground and/or sieved. Additional information on this subject can be found in Patent EP 0740577B1 in the name of SOLVAY.

The appended FIG. 1 serves to illustrate one particular embodiment of the invention.

A sodium bicarbonate powder 1 is injected, by means of a device 2 for dry scrubbing of flue gases, into a flue gas 3 contaminated with sulfur dioxide. The sulfur dioxide reacts with the sodium bicarbonate to produce sodium sulfate. The device contains a filter intended for supplying a scrubbed flue gas 3', on the one hand, and sodium sulfate 4, on the other hand. This sodium sulfate is dissolved in a dissolver 5 fed with water 6. The resulting sodium sulfate solution 7 is introduced into the acid compartment of a two-compartment electrodialyzer 8. Solutions of sodium bisulfate 9, on the one hand, and of sodium hydroxide 10, on the other hand, are respectively extracted from the acid and basic compartments of the electrodialyzer. The sodium bisulfate solution reacts in a reactor 11 with calcium carbonate 12. This reaction produces sodium sulfate 13, which is recycled to the dissolver 5, calcium sulfate 14, which is valorized and carbon dioxide 15. The sodium hydroxide solution is recycled to the inlet of the basic compartment of the electrodialyzer, after optional addition of water. One portion is withdrawn and introduced into a gas-liquid contactor 17 fed by gas poor in $CO_2$ 16, in which a carbonated solution is produced. This solution is then introduced into a second gas-liquid contactor fed by carbon dioxide gas 15, in which sodium bicarbonate crystals are precipitated to form a suspension 19. These crystals are separated from the aqueous suspension and dried in a centrifuging and drying device 20 to provide a sodium bicarbonate powder 21. This powder is added to the powder 1.

Example 1000 g of $Na_2SO_4$, resulting from the dry desulfurization of flue gases by means of sodium bicarbonate, is taken. This quantity of $Na_2SO_4$ is then dissolved in 2500 g of water. The resulting aqueous solution is introduced into the acid compartments (located between the cationic face of the bipolar membrane and the cationic membrane) of a two-compartment electrodialyzer. The basic compartments are fed with water. The bipolar membranes used are produced by ASTOM (Neosepta BP—1E model) and the cationic membranes are Nafion® 324 membranes, produced by DuPont. The temperature of the aqueous $Na_2SO_4$ solution is 40° C. 6.3 faradays are passed through the electrodialyzer (voltage of 1.4 V per cell, current density of 1 kA/m$^2$). Recovered from the basic compartments is a solution comprising 250 g of sodium hydroxide and from the acid compartments a solution comprising 760 g of NaHSO$_4$ in which 100 g of unconverted Na$_2$SO$_4$ remains. The current efficiency is 0.9. The solution containing 760 g of NaHSO$_4$ is then reacted with 316 g of CaCO$_3$. A solution is obtained that contains 450 g of Na$_2$SO$_4$, which is sent back to the electrodialyzer, 430 g of gypsum (CaSO$_4$), which is separated from the solution and upgraded separately, and 140 g of CO$_2$, which is recovered. Finally, the sodium hydroxide solution is carbonated, firstly by means of a gas containing 139 g of CO$_2$ diluted in 675 g of air, the gas originating from the combustion of a fossil gas. The carbonation is then continued by means of 139 g of CO$_2$ (100%) recovered during the reaction with calcium carbonate. 530 g of sodium bicarbonate is finally obtained.

The invention claimed is:

1. A process for producing sodium bicarbonate for purifying flue gases, comprising: subjecting an aqueous solution containing primary sodium sulphate to electrodialysis to produce a sodium hydroxide solution and a sodium bisulfate solution, the sodium hydroxide solution being carbonated in order to obtain sodium bicarbonate.

2. The process according to claim 1, wherein the electrodialysis is carried out in a two-compartment electrodialyzer.

3. The process according to claim 1, wherein the sodium hydroxide is carbonated by means of a gas comprising carbon dioxide obtained by reaction of sodium bisulfate with calcium carbonate, with co-production of secondary sodium sulfate and gypsum.

4. The process according to claim 3, wherein the co-produced secondary sodium sulfate is recycled and subjected to electrodialysis.

5. The process according to claim 1, wherein the primary sodium sulfate is a residue of the flue gas purification in sulfur oxides by means of sodium bicarbonate.

6. A process for purifying a flue gas that contains sulfur oxides, comprising injecting a reactant containing at least 10% of the sodium bicarbonate obtained by the process according to claim 1 into a duct in which the flue gas flows.

7. The process according to claim 6, wherein the reactant contains at least 50% of said sodium bicarbonate.

8. The process according to claim 6, wherein the reactant is in the form of powder having an average particle diameter between 5 and 50 µm.

9. A process for producing sodium bicarbonate for purifying flue gases, comprising: subjecting an aqueous solution containing primary sodium sulfate to electrodialysis to produce a sodium hydroxide solution and a sodium bisulfate solution, the sodium hydroxide solution being carbonated in order to obtain sodium bicarbonate, wherein at the end of the carbonation of the aqueous sodium hydroxide solution, sodium bicarbonate is crystallized to obtain an aqueous suspension of sodium bicarbonate crystals.

10. The process according to claim 9, wherein the sodium bicarbonate crystals are separated from the suspension and then dried.

11. The process according to claim 10, wherein the co-produced secondary sodium sulfate is recycled and subjected to electrodialysis.

12. The process according to claim 9, wherein the sodium hydroxide is carbonated by means of a gas comprising carbon dioxide obtained by reaction of sodium bisulfate with calcium carbonate, with co-production of secondary sodium sulfate and gypsum.

13. The process according to claim 9, wherein the sodium hydroxide is carbonated in two steps:
a first carbonation step in which the sodium hydroxide solution is carbonated by means of a gas containing less than 50% by weight of CO$_2$ to obtain a sodium carbonate solution with a sodium carbonate concentration greater than 20% by weight; and
a second carbonation step in which the sodium carbonate solution obtained following this first carbonation is (bi)carbonated by means of a gas containing more than 50% by weight of CO$_2$ to obtain said sodium bicarbonate.

14. The process according to claim 13, wherein the two steps for carbonation of the sodium hydroxide solution use different gas-liquid contactors.

15. The process according to claim 9, wherein the primary sodium sulfate is a residue of the flue gas purification in sulfur oxides by means of sodium bicarbonate.

16. The process according to claim 9, wherein the electrodialysis is carried out in a two-compartment electrodialyzer.

17. The process according to claim 16, wherein the electrodialyzer comprises bipolar membranes and cationic membranes in alternation, said bipolar membranes comprising an anionic face and a cationic face; wherein basic compartments located between the anionic face of the bipolar membrane and the cationic membrane are fed with water or with a dilute NaOH solution, which is further concentrated in NaOH at the outlet of such compartments; and wherein acid compartments located between the cationic face of the bipolar membrane and the cationic membrane are fed with the solution of Na$_2$SO$_4$.

* * * * *